3,562,290
PROCESS FOR MAKING 2-BENZIMIDAZOLE-CARBAMIC ACID ALKYL ESTERS
Maged Mohamed Fawzi, Wilmington, Del., assignor to E. I. du Pont de Nemours and Company, Wilmington, Del., a corporation of Delaware
No Drawing. Filed Nov. 7, 1967, Ser. No. 681,102
Int. Cl. C07d 49/38
U.S. Cl. 260—309.2                5 Claims

ABSTRACT OF THE DISCLOSURE

Compounds of the formula:

$$\begin{array}{c} RS \\ \phantom{RS}\diagdown \\ \phantom{RSRS}C=N\overset{O}{\overset{\|}{C}}OR_2 \\ \phantom{RS}\diagup \\ R_1S \end{array}$$

where R, $R_1$ and $R_2$ are as defined hereinafter are useful as chemical intermediates. When reacted with o-phenylenediamines, they form 2-benzimidazolecarbamic acid alkyl esters, which compounds are useful as fungicides.

Exemplary of the compounds is methyl bis(methyl) methyleneaminoformate.

BACKGROUND OF THE INVENTION 2-benzimidazolecarbamic acid, alkyl esters are useful as fungicides and they are also useful as intermediates in the preparation of dialkyl esters of 1 - carboxy - 2-benzimidazolecarbamic acid fungicides. These latter compounds and their fungicidal activity are set forth in detail in U.S. Pat. 2,933,504.

U.S. Pat. 3,010,968 describes a process for making 2-benzimidazolecarbamic acid, alkyl esters in which an acylated 2-methylthiopseudourea is reacted with o-phenylenediamine.

The invention is directed to production of such 2-benzimidazolecarbamic acid, alkyl esters by the reaction of the novel alkyl bis(alkyl or arylthio)methyleneaminoformates of this invention with o-phenylenediamines.

BRIEF SUMMARY OF THE INVENTION

This invention relates to novel compounds of the following formula:

$$\begin{array}{c} RS \\ \phantom{RS}\diagdown \\ \phantom{RSRS}C=N\overset{O}{\overset{\|}{C}}OR_2 \\ \phantom{RS}\diagup \\ R_1S \end{array}$$

wherein

R and $R_1$ can be the same or different and are alkyl of 1 through 4 carbon atoms, alkenyl of 3 through 5 carbon atoms, cyclohexyl, $$\underset{(X)_n}{\diagup\!\!\diagdown}\!\!-\!\!\text{or}\;\;\underset{(X)_n}{\diagup\!\!\diagdown}\!\!-\!\!CH_2-$$

provided that R and $R_1$ can be joined to form a ring containing 2 or 3 methylene units;
X is halogen, methyl or nitro;
$n$ is 0, 1 or 2, provided that when $n$ is 1 or 2, the substituents do not have to be identical;
$R_2$ is methyl, ethyl, isopropyl or sec-butyl.

Preferred compounds include those where R and $R_1$ are alkyl of one through three carbon atoms or benzyl, and most preferred is the compound where R, $R_1$ and $R_2$ are methyl. The invention is also directed to the synthesis of 2-benzimidazolecarbamic acid, alkyl esters from the novel alkyl bis(alkyl or arylthio)methyleneaminoformates by the reaction set forth in the following equation:

$$\begin{array}{c} RS \\ \phantom{RS}\diagdown \\ \phantom{RSRS}C=N\overset{O}{\overset{\|}{C}}OR_2 \\ \phantom{RS}\diagup \\ R_1S \end{array} + \underset{Z}{\diagup\!\!\diagdown}\!\!\begin{array}{c}-NH_2 \\ -NH_2\end{array} \xrightarrow{\text{solvent}}$$

$$\underset{Z}{\diagup\!\!\diagdown}\!\!\begin{array}{c} N \\ \phantom{N}\diagdown \\ \phantom{NN}-\!\!N\!\!-\!\!\overset{O}{\overset{\|}{C}}OR_2 \\ \phantom{N}\diagup \\ N\!\!-\!\!H \\ H \end{array} + RSH + R_1SH$$

where R, $R_1$ and $R_2$ are as previously described; and where Z is alkyl of 1 through 5 carbon atoms, halogen, nitro or hydrogen.

DETAILED DESCRIPTION OF THE INVENTION

The novel alkyl bis(alkyl or arylthio)methyleneaminoformates of the invention can be prepared by a two-step sequence as indicated in the following equations:

Reaction 1

$$RSCN + R_1SH \xrightarrow[CHCl_3]{H\text{ (halogen)}} \begin{array}{c} RS \\ \phantom{RS}\diagdown \\ \phantom{RSRS}CN=NH\cdot H\text{ (halogen)} \\ \phantom{RS}\diagup \\ R_1S \end{array}$$

Reaction 2

$$\begin{array}{c} RS \\ \phantom{RS}\diagdown \\ \phantom{RSRS}C=NH\cdot HCl \\ \phantom{RS}\diagup \\ R_1S \end{array} + R_2O\overset{O}{\overset{\|}{C}}Cl \xrightarrow{\text{Acid Acceptor}} \begin{array}{c} RS \\ \phantom{RS}\diagdown \\ \phantom{RSRS}C=N-\overset{O}{\overset{\|}{C}}-OR_2 \\ \phantom{RS}\diagup \\ R_1S \end{array}$$

Optionally, the first step can be conducted in the manner illustrated by the following equation:

Optional Reaction 1

$$\begin{array}{c} SH \\ | \\ (CH_2)_n + \text{(halogen) CN} \\ | \\ SH \end{array} \longrightarrow (CH_2)_n\!\!\begin{array}{c}\diagup S\diagdown \\ \phantom{\diagup}C=NH\cdot H\text{ (halogen)} \\ \diagdown S\diagup \end{array}$$

where $n$ is 2 or 3

The reaction of mercaptans with thiocyanates or cyanogen halides as set forth in Reaction 1 is known in the art and is explained in greater detail in J. Org. Chem., 29, p. 739 (1964). The teachings of this reference are incorporated herein by reference.

The novel alkyl bis(alkyl or arylthio)methylene-aminoformates of the invention are produced as illustrated in Reaction 2, when the product of Reaction 1 is reacted with a chloroformate in the presence of an acid acceptor.

The acid acceptor can be an organic or inorganic base such as sodium hydroxide, sodium bicarbonate, or triethylamine in a polar or non-polar solvent such as ether, benzene, dimethylformamide, acetone, cyclohexane, dioxane or water.

The conditions of Reaction 2 are not critical. Generally, the reaction will be conducted with agitation at room temperature under atmospheric pressure. The time of the reaction also is not critical. The reaction will be continued until the desired alkyl bis(alkyl or arylthio)methyleneaminoformate has formed; generally this will take from 30 minutes to 5 hours.

After the reaction has been completed, the compounds can be isolated by conventional methods.

As previously set forth, the novel compounds of the invention can be used for the synthesis of 2-benzimidazolecarbamate acid, alkyl esters by reacting them with o-phenylenediamines in the presence of a suitable solvent at temperatures from 25° to 150° C.

The reaction can also be run in the absence of a solvent; however, the use of polar or non-polar solvents such as tetrahydrofuran, water-acetic acid, ethanol or dimethyl formamide is preferred.

The concentrations of the starting materials in the reaction mixture are only limited by the handling characteristics of the reaction mass.

During the course of the reaction, the reaction mixture should be stirred while the temperature is maintained between 25 to 150° C. The time of this reaction can range from 30 to 300 minutes. When the reaction is complete, the 2-benzimidazolecarbamate acid, alkyl ester product will be precipitated by cooling. The product is then isolated by conventional techniques such as filtration.

The invention will be more easily understood and practiced by reference to the following illustrative examples. All parts are parts by weight unless otherwise indicated.

EXAMPLE 1

Synthesis of methyl bis(methylthio)methyleneaminoformate

Seventeen parts of solid sodium bicarbonate is added to a suspension of 15.7 parts of dimethyl dithioiminocarbonate hydrochloride in cold (5° C.) acetone (200 parts) which contains 9.5 parts of methyl chloroformate. The mixture is stirred for 30 minutes at 5° C., then for four hours at room temperature.

The precipitate present is filtered and the filtrate is dried over magnesium sulfate. Removal of the solvent gives 77 parts of methyl bis(methylthio)methyleneaminoformate. This product is sufficiently pure for reaction with o-phenylenediamine to form 2-benzimidazolecarbamate acid, methyl ester.

A pure sample of the product is obtained by recrystallization from chloroform-ether solvent, and it melts at 48°–50° C. and gives the following analysis: calculated for $C_5H_9NO_2S_2$. Calculated (percent): C, 33.45; H, 5.12; N, 7.88. Found (percent): C, 33.50; H, 5.02; N, 7.82.

EXAMPLE 2

Synthesis of 2-benzimidazole carbamic acid, methyl ester

Methyl bis(methylthio)methyleneaminoformate (17.9 parts) is added to a solution of 10 parts of o-phenylenediamine in 200 parts of tetrahydrofuran. The mixture is refluxed for 3 hours, cooled and the precipitate present is filtered. The identity of the isolated 2-benzimidazole-carbamic acid, methyl ester is established by comparison of the melting point and infrared spectrum with those of an authentic sample.

EXAMPLE 3

One-step synthesis of 2-benzimidazolecarbamic acid, methyl ester

A solution of 10% sodium hydroxide is added dropwise to a cold (5–12° C.) stirred solution of 39.4 parts of dimethyl dithioiminocarbonate hydrochloride and 25 parts of methyl chloroformate in 100 parts of water.

When the pH of the medium reaches 7.5, the addition of sodium hydroxide is stopped and a slurry of o-phenylenediamine (21.6 parts) in 10 parts of glacial acetic acid is added. The reaction mixture is stirred and refluxed for 75 minutes, cooled and the solid present is filtered. The solid is washed with a small amount of alcohol to give 13 parts of the subject compound. The identity of the product is confirmed by infrared spectral comparisons.

EXAMPLES 4–13

The following intermediates are prepared in the manner of methyl bis(methylthio)methyleneaminoformate of Example 1 by substituting equivalent amounts for the dimethyl dithioiminocarbonate hydrochloride and methyl chloroformate used in Example 1.

| Starting materials | Product |
|---|---|
| (4) Butyl methyl dithioiminocarbonate hydrochloride plus sec-butyl chloroformate. | sec-Butyl[(butylthio)(methylthio)methyleneamino]formate. |
| (5) Allyl cyclohexyl dithioiminocarbonate hydrochloride plus isopropyl chloroformate. | Isopropyl[(allylthio)(cyclohexylthio)methyleneamino]formate. |
| (6) 3,4-dichlorobenzyl methyl dithioiminocarbonate hydrochloride plus methyl chloroformate. | Methyl[(3,4-dichlorobenzylthio)(methylthio)methyleneamino]formate. |
| (7) Methyl phenyl dithioiminocarbonate hydrochloride plus ethyl chloroformate. | Ethyl[(methylthio)(phenylthio)methyleneamino]formate. |
| (8) Trimethylene dithioiminocarbonate hydrochloride plus ethyl chloroformate. | Ethyl[(trimethylenedithio)methyleneamino]formate. |
| (9) Dibutyldithioiminocarbonate hydrochloride plus methyl chloroformate | Methyl bis(butylthio)methyleneiminoformate. |
| (10) Methyl 4-nitrophenyl dithioiminocarbonate hydrochloride plus isopropyl chloroformate. | Isopropyl[(methylthio)(4-nitrophenylthio)methyleneamino]formate. |
| (11) Diphenyl dithioiminocarbonate hydrochloride plus methylchloroformate. | Methyl bis(phenylthio)methyleneaminoformate. |
| (12) Allyl 4-chlorophenyl dithioiminocarbonate hydrochloride plus methylchloroformate. | Methyl[(allylthio)(4-chlorophenylthio)methyleneamino]formate. |
| (13) 2-chloro-4-tolyl methyl dithioiminocarbonate hydrochloride plus ethyl chloroformate. | Ethyl[(2-chloro-4-tolylthio)(methylthio)methyleneamino]formate. |

EXAMPLES 14–16

Heating o-phenylenediamine and an alkyl bis(alkyl or arylthio)methyleneaminoformate in a polar or a nonpolar solvent gives 2-benzimidazolecarbamic acid, alkyl esters as in Examples 2 and 3. The following examples are illustrative of this process:

| Starting materials | Product |
|---|---|
| (14) sec-butyl[(butylthio)(methylthio)methyleneamino]formate plus o-phenylenediamine | 2-benzimidazolecarbamic acid, sec-butyl ester. |
| (15) isopropyl[(allylthio)(cyclohexylthio)methyleneamino]formate plus o-phenylenediamine | 2-benzimidazolecarbamic acid, isopropyl ester. |
| (16) ethyl[(methylthio)(phenylthio)methyleneamino]formate plus o-phenylenediamine | 2-benzimidazolecarbamic acid, ethyl ester. |

EXAMPLES 17–25

The following 2-benzimidazolecarbamic acid, alkyl esters can be prepared from the reactants given below according to the methods described in Examples 2 and 3.

| Reactants | Product |
|---|---|
| (17) 4-butyl-1,2-phenylenediamine and methyl bis(methylthio)methyleneaminoformate | 5-butyl-2-benzimidazolecarbamic acid, methyl ester. |
| (18) 4-methyl-1,2-phenylenediamine and methyl bis(methylthio)methyleneaminoformate | 5-methyl-2-benzimidazolecarbamic acid, methyl ester. |
| (19) 4-chloro-1,2-phenylenediamine and methyl bis(methylthio)methyleneaminoformate | 5-chloro-2-benzimidazolecarbamic acid, methyl ester. |
| (20) 4-bromo-1,2-phenylenediamine and methyl bis(methylthio)methyleneaminoformate | 5-bromo-2-benzimidazolecarbamic acid, methyl ester. |
| (21) 4-nitro-1,2-phenylenediamine and methyl bis(methylthio)methyleneaminoformate | 5-nitro-2-benzimidazolecarbamic acid, methyl ester. |
| (22) 4-fluoro-1,2-phenylenediamine and methyl bis(methylthio)methyleneaminoformate | 5-fluoro-2-benzimidazolecarbamic acid, methyl ester. |
| (23) 4-iodo-1,2-phenylenediamine and methyl bis(methylthio)methyleneaminoformate | 5-iodo-2-benzimidazolecarbamic acid, methyl ester. |
| (24) 3-chloro-1,2-phenylenediamine and sec-butyl bis(methylthio)methyleneaminoformate. | 4-chloro-2-benzimidazolecarbamic acid, sec-butyl ester. |
| (25) 3-bromo-1,2-phenylenediamine and ethyl bis(methylthio)methyleneaminoformate | 4-bromo-2-benzimidazolecarbamic acid, ethyl ester. |

What is claimed is:

1. A process for making 2 - benzimidazolecarbamic acid, alkyl ester comprising reacting a compound of the formula:

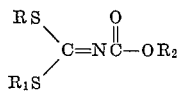

wherein

R and R$_1$ are the same or different and are alkyl of 1 through 4 carbon atoms, alkenyl of 3 through 5 carbon atoms, cyclohexyl,

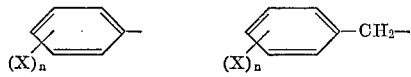

provided that R and R$_1$ can be joined to form a ring containing 2 or 3 methylene units;

X is halogen, methyl or nitro;

$n$ is 0, 1 or 2, provided that when $n$ is 1 or 2, the substituents do not have to be identical;

R$_2$ is methyl, ethyl, isopropyl or sec-butyl; with an o-phenylenediamine of the formula

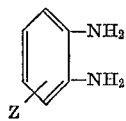

where Z is alkyl of 1 through 5 carbon atoms, halogen, nitro or hydrogen; at a temperature between 25° and 150° C.

2. The process of claim 1 wherein Z is hydrogen.

3. The process of claim 1 wherein the reaction is conducted in the presence of a solvent selected from the group consisting of tetrahydrofuran, water-acetic acid, ethanol or dimethyl formamide.

4. The process of claim 2 wherein the reaction is conducted in the presence of a solvent selected from the group consisting of tetrahydrofuran, water-acetic acid, ethanol or dimethyl formamide.

5. A process for making 2-benzimidazolecarbamic acid, methyl ester comprising reacting

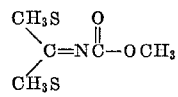

with o-phenylenediamine.

No references cited.

NATALIE TROUSOF, Primary Examiner

U.S. Cl. X.R.

260—327, 468, 470, 481, 566, 999